US012519780B2

(12) United States Patent
Dalimba et al.

(10) Patent No.: US 12,519,780 B2
(45) Date of Patent: Jan. 6, 2026

(54) LOGIN BASED FEATURES

(71) Applicant: DISH Network Technologies India Private Limited, Bangalore (IN)

(72) Inventors: Laxminarayana Dalimba, Bengaluru (IN); Himanshu Jain, Bengaluru (IN)

(73) Assignee: DISH Network Techonlogies India Private Limited, Bengaluru (IN)

(*) Notice: Subject to any disclaimer, the term of this patent is extended or adjusted under 35 U.S.C. 154(b) by 143 days.

(21) Appl. No.: 18/407,659

(22) Filed: Jan. 9, 2024

(65) Prior Publication Data
US 2025/0227103 A1 Jul. 10, 2025

(51) Int. Cl.
H04L 9/40 (2022.01)
(52) U.S. Cl.
CPC .................. H04L 63/083 (2013.01)
(58) Field of Classification Search
CPC .................................. H04L 63/0861
USPC ............................................................ 726/6
See application file for complete search history.

(56) References Cited

U.S. PATENT DOCUMENTS

| 6,054,950 | A  | 4/2000 | Fontana |
| 6,571,221 | B1 | 5/2003 | Stewart et al. |
| 7,231,516 | B1 | 6/2007 | Sparrell et al. |
| 7,372,821 | B2 | 5/2008 | Sato et al. |
| 8,108,493 | B2 | 1/2012 | Lakamp |
| 8,495,729 | B2 | 7/2013 | Park |
| 8,621,530 | B1 | 12/2013 | Guzman et al. |
| 8,856,843 | B1 | 10/2014 | Hubach et al. |
| 8,903,980 | B2 | 12/2014 | Hyvarinen et al. |
| 9,215,139 | B2 | 12/2015 | Hyvarinen et al. |
| 9,326,139 | B2 | 4/2016 | Johan |
| 9,330,250 | B2 | 5/2016 | Medvinsky et al. |
| 9,532,097 | B1 | 12/2016 | Chen et al. |

(Continued)

OTHER PUBLICATIONS

U.S. Appl. No. 17/960,185, filed Oct. 5, 2022.
(Continued)

Primary Examiner — Jahangir Kabir
(74) Attorney, Agent, or Firm — Wash Park IP Ltd.; John T. Kennedy

(57) ABSTRACT

A system includes a fixed device, an account management system ("AMS") server, a property management system ("PMS") server, a personal user device, and a content server. The PMS server associate the fixed device with a given user. The fixed device, when executing computer instructions for a presence application, perform presence operations including receiving a $1^{st}$ user code from the PMS server, receiving a $1^{st}$ user access code from the AMS server, and communicating the $1^{st}$ user access code as a $2^{nd}$ user access code to the PUD. The AMS servers uses the $2^{nd}$ user access code to verify the PUD can access data stored by the AMS server and the content server uses the $2^{nd}$ user access code to validate a request, from the PUD, to receive content from the content server. Processes, devices, computer readable mediums are also described.

20 Claims, 4 Drawing Sheets

(56) References Cited

U.S. PATENT DOCUMENTS

| | | | |
|---|---|---|---|
| 10,291,956 | B2 | 5/2019 | Zdepski et al. |
| 10,327,035 | B2 | 6/2019 | Zerr et al. |
| 10,631,042 | B2 | 4/2020 | Zerr et al. |
| 10,743,075 | B2 | 8/2020 | Zerr et al. |
| 10,996,702 | B2 | 5/2021 | Imes et al. |
| 11,330,326 | B2 | 5/2022 | Zerr et al. |
| 11,671,651 | B2 | 6/2023 | Zerr et al. |
| 11,770,197 | B2 | 9/2023 | Zhang et al. |
| 12,184,439 | B2 | 12/2024 | Ergen |
| 2003/0061315 | A1 | 3/2003 | Jin |
| 2005/0283791 | A1 | 12/2005 | McCarthy et al. |
| 2006/0281477 | A1 | 12/2006 | Downes |
| 2007/0088814 | A1 | 4/2007 | Torii |
| 2008/0004075 | A1 | 1/2008 | Horton et al. |
| 2008/0095374 | A1 | 4/2008 | Schreyer |
| 2010/0128709 | A1 | 5/2010 | Liu et al. |
| 2010/0180312 | A1 | 7/2010 | Toya |
| 2011/0116419 | A1 | 5/2011 | Cholas et al. |
| 2011/0314192 | A1 | 12/2011 | Ahn et al. |
| 2012/0151510 | A1 | 6/2012 | Ramaswamy et al. |
| 2012/0210011 | A1 | 8/2012 | Liu et al. |
| 2012/0259967 | A1 | 10/2012 | Hyvarinen et al. |
| 2013/0111522 | A1 | 5/2013 | Tatem et al. |
| 2013/0258197 | A1 | 10/2013 | Schmehl et al. |
| 2013/0346564 | A1 | 12/2013 | Warrick et al. |
| 2014/0033236 | A1 | 1/2014 | Guzman et al. |
| 2014/0337927 | A1 | 11/2014 | Medvinsky et al. |
| 2015/0051994 | A1 | 2/2015 | Ward et al. |
| 2015/0324332 | A1 | 11/2015 | Perret et al. |
| 2016/0080821 | A1 | 3/2016 | Makhijani et al. |
| 2016/0099928 | A1 | 4/2016 | Chatwin et al. |
| 2016/0227408 | A1 | 8/2016 | Sherin |
| 2017/0094345 | A1 | 3/2017 | Zerr et al. |
| 2018/0095121 | A1 | 4/2018 | Gilson et al. |
| 2018/0343397 | A1 | 11/2018 | Chandrashekar et al. |
| 2019/0364120 | A1 | 11/2019 | Bandela et al. |
| 2021/0203498 | A1* | 7/2021 | Shin .................. H04L 9/083 |
| 2022/0021684 | A1* | 1/2022 | Mensah ............. H04L 63/105 |
| 2022/0137204 | A1 | 5/2022 | Nguyen et al. |
| 2022/0148217 | A1 | 5/2022 | Hallett et al. |
| 2022/0284624 | A1 | 9/2022 | Nimmagadda et al. |
| 2023/0116882 | A1 | 4/2023 | Bates et al. |
| 2023/0222674 | A1 | 7/2023 | Balarajashetty et al. |
| 2023/0269420 | A1 | 8/2023 | Zerr et al. |
| 2023/0394951 | A1 | 12/2023 | Jeong et al. |
| 2024/0121129 | A1 | 4/2024 | Ergen et al. |
| 2024/0305496 | A1 | 9/2024 | Ergen et al. |
| 2024/0346274 | A1* | 10/2024 | DiTullio ............... G08C 17/02 |
| 2025/0039860 | A1 | 1/2025 | Reddy et al. |
| 2025/0088822 | A1 | 3/2025 | McClellan |

OTHER PUBLICATIONS

U.S. Appl. No. 18/669,902, filed May 21, 2024.
U.S. Appl. No. 18/626,211, filed Apr. 3, 2024.
U.S. Appl. No. 18/885,679, filed Sep. 15, 2024.
Fan, J. I., and K. Khoshelham. "Augmented Reality Asset Tracking Using Hololens." ISPRS Annals of the Photogrammetry, RemoteSensing and Spatial Information Sciences 4 (2021): 121-127. (Year: 2021).
U.S. Appl. No. 17/960,185, Prosecution History through Oct. 26, 2024.
Veluchandhar, V., and K. Kandavel. "WATS-SNADSC: A Wireless Asset Tracking System using Sensor Networks with Auto DetectSpy Camera in Forensic Science." J. Sci 1.4 (2008): 178-185. (Year: 2008).
U.S. Appl. No. 17/575,497, filed Jan. 13, 2022.
U.S. Appl. No. 18/669,902, Notice of Allowance, Feb. 27, 2025 (available at USPTO Patent Center).
U.S. Appl. No. 17/575,497, Final Office Action, Sep. 28, 2024 (available at Patent Center).
U.S. Appl. No. 17/960,185, Prosecution History through May 21, 2024 (available at Patent Center).
U.S. Appl. No. 18/626,211, Prosecution History through May 21, 2024 (available at Patent Center).
U.S. Appl. No. 17/960,185, Non-final Office Action, dated Dec. 12, 2024 (available at USPTO Patent Center).
U.S. Appl. No. 17/960,185, Response to Non-final Office Action with electronic Terminal Disclaimer, dated Dec. 12, 2024 (available at USPTO Patent Center).
"Ultra-Wideband RTLS, Positioning, & Sensor Technology", Inpixon. com, web page downloaded from the Internet at https://www.inpixon.com/technology/standards/ultra-wideband, on Jun. 9, 2024.
U.S. Appl. No. 18/885,679, filed Sep. 15, 2024 (Available at USPTO Patent Center).
U.S. Appl. No. 17/575,497, Prosecution History through Sep. 15, 2024 (available at Patent Center).
U.S. Appl. No. 17/960,185, Prosecution History through Sep. 15, 2024 (available at Patent Center).
U.S. Appl. No. 18/626,211, Prosecution History through Sep. 15, 2024 (available at Patent Center).
Wikipedia, "Indoor Positioning System", downloaded from the Internet on Oct. 19, 2021 at https://en.wikipedia.org/wiki/Indoor_positioning_system.
Wikipedia, definition of "AirTag", downloaded from the Internet onOct. 19, 2021 from https://en.wikipedia.org/wiki/airtag.
U.S. Appl. No. 18/885,679, Non-final Office Action, Jul. 29, 2025 (Available at USPTO Patent Center).
U.S. Appl. No. 18/885,679, Non-final Office Action, Oct. 3, 2025 (Available at USPTO Patent Center).
U.S. Appl. No. 18/626,211, Response to non-final Office Action, Oct. 15, 2025 (available at Patent Center).

* cited by examiner

LOGIN BASED FEATURES

TECHNICAL FIELD

The technology described herein generally relates to devices, systems, and processes by which a given user may access one or more content, user preference settings and/or user content control activities, as configured by a given user using a "fixed device" (as defined below) provided by a hospitality provider, using a personal user device and without requiring the given user to provide a user login or other personally identifiable information, via the personal user device, to a fixed device or otherwise.

BACKGROUND

A given user may rent a room or the like from a hotel or other lodging facility, such as a house, condominium, townhouse, apartment, or the like—each being a place of accommodation and referred to as "hotel." The hotel will commonly provide accommodation services through a "hospitality provider," with Airbnb™, Marriott®, Hilton®, and the like being non-limiting examples of hospitality providers.

The hospitality provider will commonly utilize a property management system ("PMS") to manage the renting, access, and the like of one or more rooms provided in/by a hotel. When a given user seeks to gain access to a hotel room, the given user commonly provides one or more instances of user log-in information to the hospitality provider which is stored in/by the PMS. Non-limiting examples of such user log-in information include name, residence, email address, phone number, citizenship information, passport number, driver's license number, and the like.

Upon logging-in with the PMS, the given user is commonly then able to consume content via one more content presentation devices provided by the hotel. As used herein, content is "consumed" by the presentation thereof to a user in a user perceptible format (e.g., as audio, video, motion, or otherwise) and by one or more corresponding content presentation device(s) (e.g., sounds systems, televisions, or the like). The content presentation devices provided by the hotel are herein each referred to as being a "fixed device" (as further defined herein). A given hotel room and/or the given hotel's premises may provide one more fixed devices by which the given user may consume content. For example, a given user may consume audio video content using a television provided in a hotel room, in a conference room, or otherwise. To control, manage or otherwise consume content using a fixed device, the given user may participate in one or more "content preference activities," which establish one or more "user content preferences"—with non-limiting examples including the given user specifying a user preference for channels, genres, parental control features, access time period, access codes, or the like. The given user may also participate in one or more "content control activities," with non-limiting examples including setting a recording time for a future television program (or other form of content), where such setting of recording time is one non-limiting example of a Digital Video Recorder ("DVR") activity, deleting a recorded content, viewing a recorded content, pausing a current content presentation, or the like.

The given user's setting(s) of one or more content preference activities and/or content control activities are typically stored by a server (as defined below and which may include a PMS server or other server) and available for use while the given user is lodging at the hotel and via the one or more fixed devices provided by the hotel.

The given user may desire to consume content, while at the hotel, using one or more electronic devices provided by the given user and not by the hotel-such devices are herein referred to as each being a personal user device ("PUD"), with non-limiting examples including tablet computing devices (e.g., an IPDA®), mobile phones (e.g., as an IPHONE®), laptop computers, gaming consoles (e.g., a NINENTDO SWITCH®), smartwatches (e.g., an APPLE-WATCH®), other forms of devices (as defined below), or the like.

Commonly, to gain access to the content available via the hotel using a PUD, a given user provides one or more instances of user log-in information to the PMS, the hospitality provider, or systems associated therewith. A given user, however, may be disinclined to provide such log-in information (e.g., due to concerns with data security, personal privacy, or otherwise) to the hospitality provider, PMS, or the like and cannot access hotel provided content, the user's content preferences, the user's content activities, or the like using a PUD.

Accordingly, devices, systems and processes are needed which address the above and other issues regarding a given user's consumption of content and/or otherwise access to content related devices, services and/or systems provided by a hotel in a hospitality setting, and without requiring the given user to provide log-in information to the hospitality provider.

SUMMARY

Various implementations are described of devices, systems, and processes by which a given user may access one or more content, user preference settings and/or user content control activities, as configured by a given user using a "fixed device" (as defined below) provided by a hospitality provider, using a personal user device and without requiring the given user to provide a user login or other personally identifiable information, via the personal user device, to a fixed device or otherwise.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation of the present disclosure, a system may include a fixed device, an account management system ("AMS") server coupled to the fixed device, and a property management system ("PMS") server coupled to the fixed device and the AMS server. The PMS server may associate, at a given time, the fixed device with a given user. The system may also include a personal user device ("PUD") coupled to the AMS server and the fixed device and a content server coupled to the fixed device, the AMS server and the PUD. The fixed device may further include a fixed device processor and a non-transient fixed device data store, coupled to the fixed device processor, storing first computer instructions which, when executed by the fixed device processor, instantiate a presence application. The presence application configures the fixed device to perform presence operations including receiving a $1^{st}$ user code from the PMS server, receiving a $1^{st}$ user access code from the AMS server, and communicating the $1^{st}$ user access code as a $2^{nd}$ user access code to the PUD. For at least one implementation, the $2^{nd}$ user access code may be utilized by the AMS server to verify the PUD can access data stored by the AMS server and the $2^{nd}$ user access code may be utilized by the content server to validate a request, from the PUD, to receive content from the content server.

For at least one implementation of the server, the presence operations may include communicating a $2^{nd}$ user code to the AMS server. Th AMS server may receive the 1st user code from the PMS server, and the $1^{st}$ user code and the $2^{nd}$ user code may be utilized by the AMS server to verify the fixed device can execute one or more content operations including providing at least one of content control activity data and content preference data to the AMS server for storage by the AMS server.

For at least one implementation of the server, the PMS server may associate the $1^{st}$ user code with log-in information for the given user.

For at least one implementation of the server, the $1^{st}$ user code may not contain the log-in information.

For at least one implementation of the server, the PMS server may independently communicate the $1^{st}$ user code to the AMS server, and the presence operations may include receiving, in a combined data transmission, the $1^{st}$ user code and the $1^{st}$ user access code from the AMS server. For at least one implementation, the AMS server may include an AMS processor executing non-transient computer instructions, which instantiate an AMS app which performs AMS operations including comparing the $1^{st}$ user code against the $2^{nd}$ user code and verifying the fixed device when a result of the comparing of the $1^{st}$ user code against the $2^{nd}$ user code indicates that operative data in the $1^{st}$ user code matches operative data in the $2^{nd}$ user code.

For at least one implementation of the server, the AMS operations may include receiving content control activity data from the fixed device at the given time and associating the content control activity data with the $1^{st}$ user access code.

For at least one implementation of the server, the AMS operations may include receiving content preference data from the fixed device at the given time and associating the content preference data with the $1^{st}$ user access code.

For at least one implementation of the server, the AMS operations may include verifying the $2^{nd}$ user access code against the $1^{st}$ user access code and, when verified, allowing the PUD to access one or more of content control activity data and the content preference data.

For at least one implementation of the present disclosure, an account management system ("AMS") server may include an AMS processor and a non-transient AMS data store, coupled to the AMS processor, storing non-transient computer instructions which, when executed by the AMS processor, instantiates an AMS application that performs AMS operations. The AMS operations may include receiving a $1^{st}$ user code from a property management system ("PMS") server, generating a user access code, communicating a $1^{st}$ user access code to a fixed device coupled to the AMS server, and receiving a $2^{nd}$ user access code from a personal user device ("PUD") coupled to the fixed device and the AMS server. For at least one implementation, the $1^{st}$ user access code may have been previously provided by the fixed device, as the $2^{nd}$ user access code, to the PUD and the AMS operations may include verifying the PUD can access data stored by the AMS server when the $1^{st}$ user access code and the $2^{nd}$ user access code contain identical operative data.

For at least one implementation of the AMS server, the data stored by the AMS server may include content control activity data corresponding to one or more interactions by a given user of the fixed device. For at least one implementation, the content control activity data may have been previously communicated by the fixed device to the AMS server in at least one data packet that includes the $1^{st}$ user access code.

For at least one implementation of the AMS server, the content control activity data may include data indicative of at least one trick-play operation previously requested by the given user of the fixed device.

For at least one implementation of the AMS server, the data stored by the AMS server may include content preference data corresponding to one or more preferences for a given user of the fixed device and the content preference data may have been previously determined by at least one of the fixed device and AMS server based on previous preference indications by the given user.

For at least one implementation of the AMS server, the AMS operations may include communicating the $1^{st}$ user access code to a content server, the content server verifying the $1^{st}$ user access code against a $2^{nd}$ user access code received from the PUD, and the content server granting the PUD access to at least one content when a result of the verifying of the $1^{st}$ user access code against the $2^{nd}$ user access code yields a positive result.

For at least one implementation of the AMS server, the data stored by the AMS server may include content control activity data received from the fixed device and the $2^{nd}$ user access code may be associated by the AMS server with the content control activity data.

For at least one implementation of the AMS server, the content control activity data may identify at least one trick-play operation initiated by the given user and with respect to a given content and enables the PUD to release the trick-play operation and resume presentation of the given content on the PUD.

For at least one implementation of the AMS server, the trick-play operation may be a pause in a presentation of the given content on the fixed device and the release of the trick-play operation may result in a resumption of the presentation of the given content one at least one of the fixed device and the PUD.

For at least one implementation of the AMS server, the data stored by the AMS server may include content preference data generated by the AMS server based on content requested by the fixed device from the content server and the $2^{nd}$ user access code may be associated by the AMS server with the content preference data.

For at least one implementation of the AMS server, the content preference data may limit content the PUD can receive from the content server by at least one of content rating, genre, and subject matter.

For at least one implementation of the present disclosure, a non-transitory computer readable medium, may have stored thereon computer instructions which, when executed by a processor of an account management system ("AMS") server, causes the AMS server to perform operations including generating a user access code, communicating a $1^{st}$ user access code to a fixed device coupled to the AMS server, and receiving a $2^{nd}$ user access code from a personal user device ("PUD") coupled to the fixed device and the AMS server. For at least one implementation, the $1^{st}$ user access code may have been previously provided by the fixed device, as the $2^{nd}$ user access code, to the PUD and the operations may include verifying the PUD can access data stored by the AMS server when the $1^{st}$ user access code and the $2^{nd}$ user access code contain identical operative data.

For at least one implementation of the non-transitory computer readable medium, the operations may include communicating the $1^{st}$ user access code to a content server. The content server may verify the $1^{st}$ user access code against a $2^{nd}$ user access code received from the PUD and may grant the PUD access to at least one content when a result of the verifying of the $1^{st}$ user access code against the $2^{nd}$ user access code yields a positive result. For at least one implementation, the data stored by the AMS server may include content control activity data received from the fixed device and the $2^{nd}$ user access code may be associated by the AMS server with the content control activity data. For at least one implementation, the content control activity data may include data indicative of at least one trick-play operation previously requested by a given user of the fixed device. The trick-play operation may include a pause in a presentation of a given content on the fixed device. A release of the trick-play operation may result in a resumption of the presentation of the given content one at least one of the fixed device and the PUD. For at least one implementation, the data stored by the AMS server may include content preference data corresponding to one or more preferences for a given user of the fixed device. The content preference data may have been previously determined by at least one of the fixed device and AMS server based on previous preference indications by the given user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of various implementations of the present disclosure is provided in the following written description and illustrated in the accompanying drawings.

BRIEF DESCRIPTION OF THE DRAWINGS

The features, aspects, advantages, functions, modules, and components of the devices, systems, and processes provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

DETAILED DESCRIPTION

Figure 1:
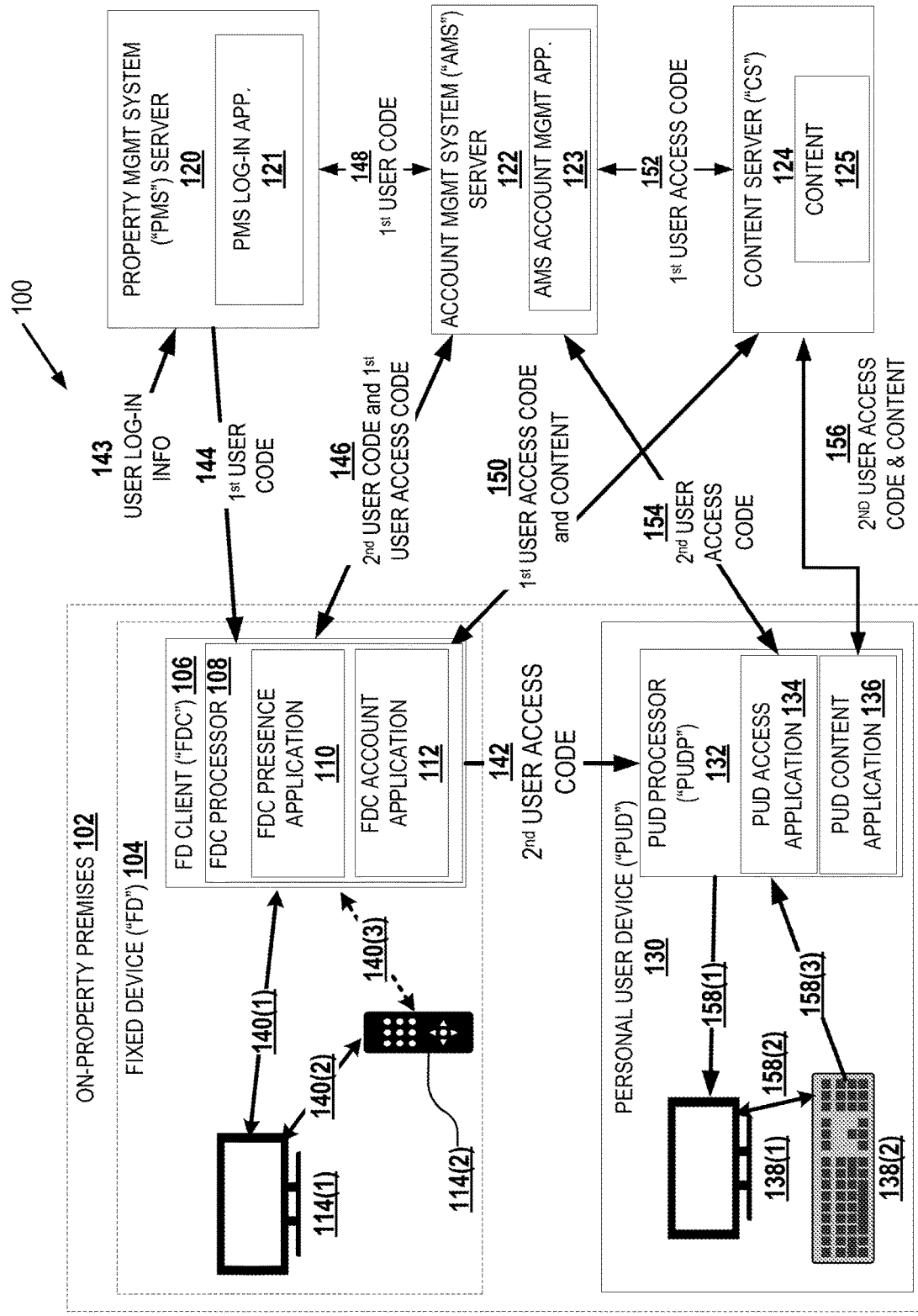
FIG. 1 is a schematic illustration of an implementation of a secure and non-user identifying log-in system and in accordance with at least one implementation of the present disclosure.

Various implementations of the present disclosure describe devices, systems, and processes by which a given user may access, using a PUD, one or more content, user preference settings and/or user content control activities (as configured by a given user using a "fixed device" provided by a hospitality provider) and without the given user being required to provide a user login and/or other personally identifiable information, via the PUD, to a fixed device, a PMS, a hospitality provider, or otherwise.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Bus" herein refers to any known and/or later arising technologies which facilitate the transfer of data within and/or between components of a device. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating AET functions. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazom.com Inc., AZURE provided by Microsoft Corp., and others.

"Component" herein refers to a Module of a Device, as further defined herein.

"Computer Data" herein refers to Data, as further defined herein.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Computer instruction" herein refers to an Instruction, as further defined herein.

"Communications Interface" herein refers to one or more separately provided components and/or integrated with other components of a Device that is configured to facilitate communication of data with one or more other devices using a Coupling. Non-limiting examples of communications interfaces including networking cards, Wi-Fi™ modules, Ethernet ports, Bluetooth radio modules, wireless radio modules, and the like. Any known or later arising components, technologies, protocols, communications mediums, or the like may be used as a communications interface in a given device in an ETS.

"Content" herein refers to data that that may be presented, using a suitable presentation device, to a user in a humanly perceptible format. When presented to a human, the data becomes "information." Non-limiting examples of content include images and graphics such as those related to television programs, streaming video, music, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized. Content may identify artists, events, venues or the like.

"Coupling" herein refers to the establishment of a communications link between two or more elements of a given system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in one or more of a cache, a memory, a data storage device, or otherwise, the given data packet has a non-transient state. For example, and not by limitation, data may take any form including as one or more applications, content, or otherwise. Instructions, as further described herein, are a form of data.

"Data store" herein refers to any non-transient device, combinations of devices, component of a device, combinations of components of one or more devices, or the like configured to store data on a temporary, permanent, non-transient, or other basis. A data store is also referred to herein as a "computer readable medium" and/or a "non-transitory computer readable medium." A data store may store data in any form, such as electrically, magnetically, physically, optically, or otherwise. A data store may include a cache on a processor, memory devices, with non-limiting examples including random access memory (RAM) and read only memory (ROM) devices, and the like. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising data storage device technologies may be utilized for a given data store. Available storage provided by a given one or more data stores may be partitioned or otherwise designated by a storage controller as providing for permanent storage and temporary storage. Non-transient data, computer instructions, or other the like may be suitably stored in a data store permanently or temporarily. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store data which, while communicated may be transient or non-transient, but while stored, is defined herein to be a form of non-transient data.

"Device" and "electronic device" herein refer to any known or later arising electrical device configured to, singularly and/or in combination, communicate, manipulate, output (e.g., for presentation as information to a human), process, store, or otherwise utilize data. Non-limiting examples of devices include User Devices, Set Top Boxes, and Servers.

"Fixed Device (FD)" herein refers to a device, provided by a hospitality provider, configured for use by a user to communicate, generate, compute, present, process, store, or otherwise manipulate data and/or information using devices and/or systems provided and/or accessed via devices and/or systems provided by the hospitality provider Non-limiting examples of FDs include set-top boxes, televisions and the like.

"Instruction" herein refers to a non-transient processor executable instruction, associated data structures, sequence of operations, program modules, or the like. An instruction is described by an instruction set. It is commonly appreciated that instruction sets are often processor specific and accordingly an instruction may be executed by a processor in a language format (e.g., a machine language format) that is translated from a higher level programming language (e.g., C++). An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Module" herein refers to and, when claimed, recites definite structure for a device that is configured to provide at least one feature and/or output signal and/or perform at least one function including one or more of the features, output signals and functions described herein. A module may provide the one or more functions using computer engines, processors, computer instructions, and the like. When a feature, output signal and/or function is provided, in whole or in part, using a processor, one more software components may be used, and a given module may include a processor configured to execute computer instructions. A person having ordinary skill in the art (a "PHOSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as-needed basis, or otherwise. Any known or later arising technologies may be used to provide a given module and the features and functions supported therein.

"Power Supply/Power" herein refers to any known or later arising technologies which facilitate the providing to and/or use by a device of electrical power. Non-limiting examples of such technologies include batteries, power converters, inductive charging components, line-power components, solar power components, and otherwise.

"Processor" herein refers to one or more known and/or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Personal User Device (PUD)" herein refers to a device configured for use by a user to communicate, generate, compute, present, process, store, or otherwise manipulate data and/or information. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"Security Component/Security" herein refers to any known or later arising components, processors, computer instructions, modules, and/or combinations thereof configured to secure data as communicated, processed, stored, output for presentation to a user, or otherwise manipulated. Non-limiting examples of security components include those which implement encryption/decryption standards, such as an Advanced Encryption Standard (AET), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include content servers, database servers, file servers, application servers, web servers, communications servers, virtual servers, computing servers, and the like. Servers may be combined into clusters (e.g., a server farm), logically or geographically grouped, combined into neural networks, or otherwise configured and/or utilized. Any known or later arising technologies may be used for a server.

A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Set Top Box" (STB) herein refers to one or more devices, servers, data stores, communications interfaces, and related components which, singularly and/or cooperatively, facilitate one or more content abridgement functions. As used herein, an "STB function" (STBF) is one or more data processing and/or communications operations performed by one or more STBs, which facilitate one or more features and functions of the present disclosure. An STB may include one or more processors, data stores, communications interfaces, user interfaces, busses, and related components. The STB components may be physically, logically, virtually or otherwise grouped and/or coupled to facilitate the one or more features and functions including, but not limited to, those identified herein.

"Substantially simultaneous(ly)" herein refers to an absence of a greater than expected and humanly perceptible delay between a first event or condition and a second event or condition. Substantial simultaneity may vary in a range of quickest to slowest expected delay, to a moderate delay, or to a longer delay. For at least one implementation, substantial simultaneity occurs within an acceptable delay (as described above).

"Trick-play operation" refers to an operation performed alone and/or in combination by a user device and/or an STB and by which a given presentation of a given content may be started, stopped, paused, reversed, fast reversed, forwarded, fast forwarded, skipped, or otherwise manipulated by a user providing user inputs to a given user device. Such user inputs may be provided to the given user device by use of a user interface (as defined below).

"User" herein refers to one or more of a single person, a household of people (such as those in a family), a collection of people (e.g., those in a fraternal organization or a club), or any other association of one or more human beings. A given household may have multiple users and/or collections of users (e.g., parents being one collection of users with children being a second collection of users in a household).

"User Interface" herein refers to one more components, provided with or coupled to a device configured to receive information from and/or present information to a user and convert information to data and vice versa. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly perceptible visual content to one or more users. A visual I/O interface may be configured to support the receiving and presenting of visual content (which is also referred to herein as being "visible signals") to users. Such visible signals may be in any form, such as still images, motion images, augmented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing software, and the like. Accordingly, it is to be appreciated that any existing or future arising visual I/O interfaces, devices, systems and/or components may be utilized by and/or in conjunction with a device to facilitate the capture, communication and/or presentation of visible signals to a user.

Content Abridgement System 100

As shown in FIG. 1 and for at least one implementation of the present disclosure, a log-in system ("LIS") system 100, may include on a given property premises 102 a fixed device 104 and one or more user interface devices 114 that are coupled to the fixed device 104 by one or more first couplings 140. A personal user device 130 is coupled to the fixed device 104 by a second coupling 142. A PMS server 120 is coupled to the fixed device 104 by a third coupling. The fixed device 104 is further coupled to an account management system ("AMS") server 122 by a fourth coupling 146. The PMS server 120 is coupled to the AMS server 122 by a fifth coupling 148. The fixed device 104 is further coupled to a content server 124 by a sixth coupling 150. The AMS server 122 is further coupled to the content server 124 by a seventh coupling 152. The personal user device 130 is further coupled to the AMS server 122 by an eighth coupling 154. The personal user device 130 is further coupled to the content server 124 by a ninth coupling 156. The personal user device 130 is further coupled to one or more personal user device interfaces 138 by one or more tenth couplings 158.

Fixed Device 104

Figure 2:
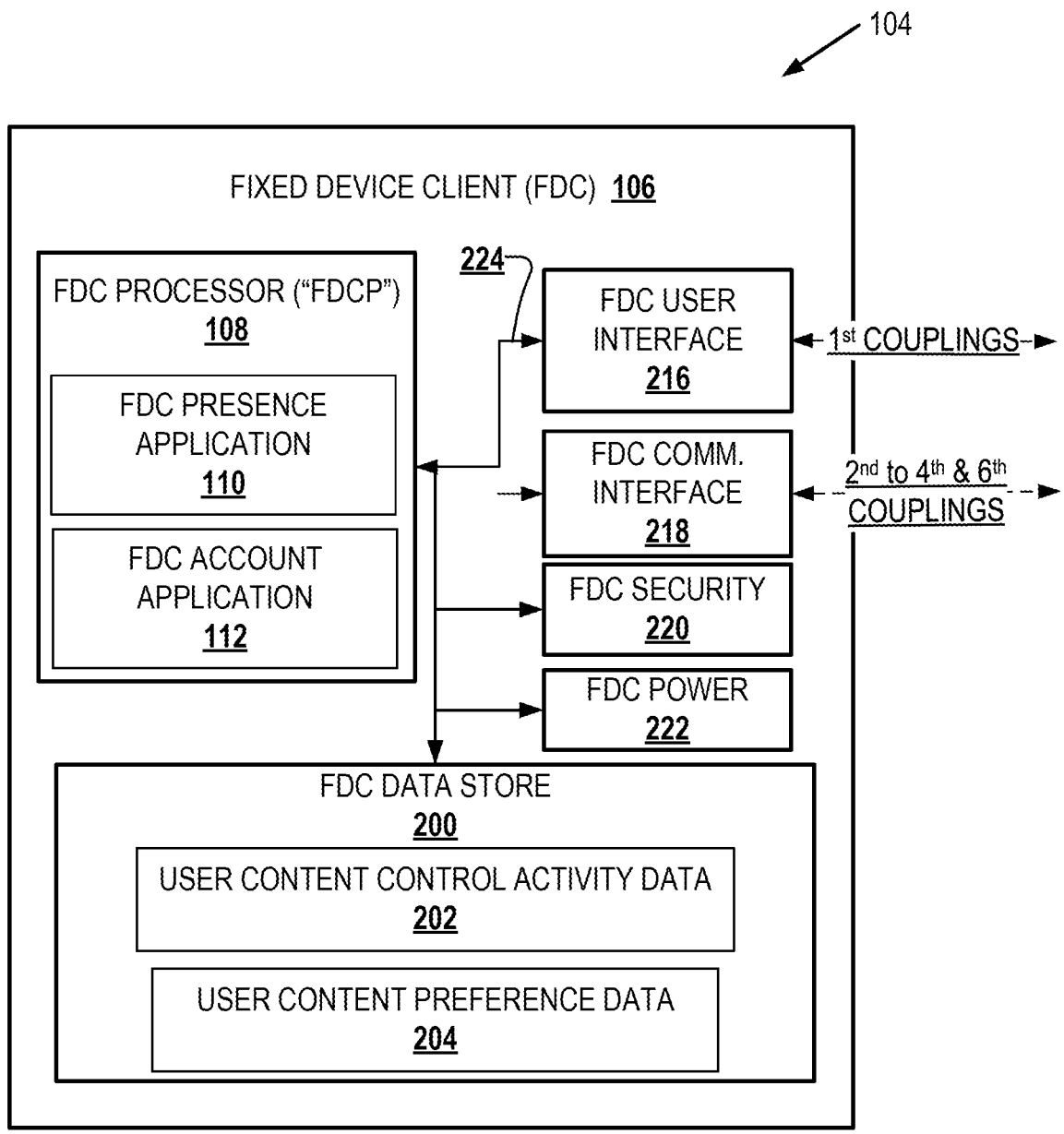
FIG. 2 is a schematic illustration of a fixed device configured for use in the secure and non-user identifying log-in system of FIG. 1 and in accordance with at least one implementation of the present disclosure.

As shown in FIG. 2 and for at least one implementation, the fixed device 104 may include a fixed device client ("FDC") 106 that is coupled to at least one user interface device 114, e.g., a television. The fixed device client 106 may include a fixed device client processor ("FDCP") 108 configured to execute a presence application 110 and an account application 112. Other applications, such as content processing applications, web browser applications, and the like may also be executed by the fixed device client 106. The fixed device client 106 may also include an FDC data store 200 configured to temporarily store user content control activity data 202 and user content preference data 204. Other data may be stored by the FDC data store 200. The fixed device client 106 may also include a user interface 216 (herein, an "FDC user interface"), and a communications interface 218 (herein, an "FDC communications interface"), a security module 220 (herein, an "FDC security module"), and a power module 222 (herein, an "FDC power module." A bus 224 (herein, the "FDC bus") couples the various fixed device client 106 components.

For at least one implementation, two or more user interface devices may be used with a given fixed device 104. For example, a first user interface device 114(1) may be a television or other video display device, while a second user interface device 114(2) may be a remote control, keyboard, or the like configured to receive user inputs and communicate such user inputs directly or indirectly, e.g., via the first user interface device 114(1), to the fixed device client 106.

The one or more user interface devices 114 are coupled to the fixed device client 106 by one or more first couplings 140. For example, a first/first coupling 140(1) may couple the first user interface device 114(1) to the fixed device client 106, a second/first coupling 140(2) may couple the first user interface device 114(1) to the second user interface device 114(2), and a third/first coupling 140(3) may couple the second user interface device 114(2) to the fixed device client 106. The user interface device(s) 114 may be utilized to generate user inputs from which the account application 112 generates one or more instances of the content control activity data and/or the content preference activity data for the given user.

For at least one implementation, one or more of the fixed device client 106, the first user interface device 114(1) and the second user interface device 114(2) may be combined, logically and/or physically, and provided as one fixed device 104 or a collection of fixed devices. For example, a combination of the fixed device client 106, the first user interface device 114(1) and the second user interface device 114(2) may be provided and integrated in a smart television.

Presence Application 110

The FDC processor 108 may be configured to execute non-transient computer instructions which instantiate a presence application 110. The computer instructions may be stored in the FD data store 200, provided on the Cloud, or otherwise accessible by the fixed device client 106.

For at least one implementation, the presence application 110 may be configured to perform presence operations which may include communicating with a PMS server 120 to identify when the given user is accessing the fixed device 104, and verify the given user is permitted to use and/or access one or more features and/or functions of the fixed device 104. The FDC presence operations may include receiving from a given user, via a user interface device 114, user identifiable information that facilitates log-in of the given user with the PMS 120.

Non-limiting examples of user identifiable information include username, password and two-factor authenticator. The user identifiable information may be tied to an account concurrently or previously established, by the given user or a person (e.g., a parent) or entity (e.g., an employer) with the hospitality provider. Such user identifiable information is referred to herein as "log-in information" (when provided in a humanly perceptible format) and/or "log-in data" (as provided for data processing, communications, storage and/or other purposes). For at least one implementation, instead and/or in addition to the given user providing the log-in information using the fixed device 104, the log-in information may be provided by the given user to the hospitality provider in person, and/or to the PMS server 120 using a compatible electronic device at check-in time. Such check-in time may occur at any time which enables the given user to access one or more given on-property premises 102 and/or one more fixed devices 104 located therein.

For at least one implementation, the presence operations may include receiving a first instance of a user code (herein, a "$1^{st}$ user code") from the PMS server 120—the PMS server 120 generating the $1^{st}$ user code upon verifying the user log-in information.

For at least one implementation, the presence operations may include communicating a second instance of the user code (herein, a "$2^{nd}$ user code") to the AMS server 122. The $2^{nd}$ user code may be utilized by the fixed device 104 to communicate data to the AMS 122 regarding one or more content control and/or content preferencing operations initiated by and/or otherwise attributable to the given user by the AMS server 122. For at least one implementation, the FDC client 106 is not configured to store user log-in information in the FDC data store 200. Instead, the user code is stored and utilized for one or more communications with the AMS server 122. As discussed below, the AMS server 122 may use the $1^{st}$ user code and the $2^{nd}$ user code to verify the fixed device 104.

Account Application 112

The FDC processor 108 may be configured to execute non-transient computer instructions which instantiate an account application 112. The computer instructions may be stored in the FD data store 200, provided on the Cloud, or otherwise accessible by the fixed device client 106.

For at least one implementation, the account application 112 may be configured to perform account operations including receiving from the AMS server 122 a first instance of a user access code (herein, the "$1^{st}$ user access code"). The $1^{st}$ user access code may be used by the account application 112 to perform account operations including: associating one or more user inputs with a content control activity and/or a content preference activity. For example, the account operations may include generating content control activity data based upon the given user requesting the fixed device 104 or another device coupled thereto to implement a trick-play mode of operation. For at least one implementation, the $1^{st}$ user access code is at least one of a QR code (a quick-response code), an alphanumeric character string, a phrase, a graphical image, a sequence of sounds, or the like.

For another example, the account operation may include generating content preference activity data based upon user actions and/or inactions with respect to one or more instances of content 125. For example, a given user repeatedly skipping commercials in a single instance and/or multiple instances of content 125 may result in the account application 112 generating user preference data representing that the given user does not prefer to watch commercials. The account application may associate user content control activity data 202 and/or user content preference data 204 with the user access code and communicate such data to the AMS server 122 for storage thereby and later use by the given user. It is to be appreciated that by associating the user content control activity data and the user content preference data with the user access code, and not include a direct association of such data with the user code, a direct association of user content control activity data and user content preference data with user log-in information is not established or maintained by the AMS 122.

The account operations may further include providing the user access code to the presence application 112. The presence application 112 may be configured to store an association of the user access code with the user code.

For at least one implementation, the account operations may include requesting content 125 from the content server, wherein the request includes the user access code. The account operations may further include receiving content 125 from the content server 124. For at least one implementation, the user access code may be communicated, by the AMS server 122, to the content server and used by the content server 124 to identify content that an otherwise non-identified given user may access, using the fixed device client 104, and the conditions (if any) under which such access may occur.

For at least one implementation, the account operations may include receiving a unique and randomly generated user access code. For at least one implementation, the user access code is at least one of a QR code (a quick-response code), an alphanumeric character string, a phrase, a graphical image, a sequence of sounds, or the like. The user access code may be communicated as a second instance of the user access code (herein, the "$2^{nd}$ user access code") by the fixed device client 106 to the personal user device 130 via the second coupling and to the AMS server 122. For at least one implementation, the $1^{st}$ user access code and the $2^{nd}$ user access code are identical and do not include log-in information for the given user or the user code.

For at least one implementation, associations of the given user with a given content requested from the content server 124 requires a reconstruction, respectively, of the association of the user access code with the user code, as maintained by the AMS server 122, the association of the user code with the log-in information, as maintained by the PMS server 120, and the association of the user log-in information with the given user, as maintained by the PMS server 120.

For at least one implementation, content 125 available to the fixed device 140 for presentation to the given user may be determined in view of the user access code communicated by the fixed device client 106 to the content server 124. The content server 124 may be configured to verify content access rights based on the user access code, as independently communicated by the AMS server 122 to the content server 124. The user access code, as communicated by the AMS server 122 may be communicated without reference to any given instance of content 125 that the fixed device client 104 has requested or may request to access.

Personal User Device (PUD) 130

Figure 3:
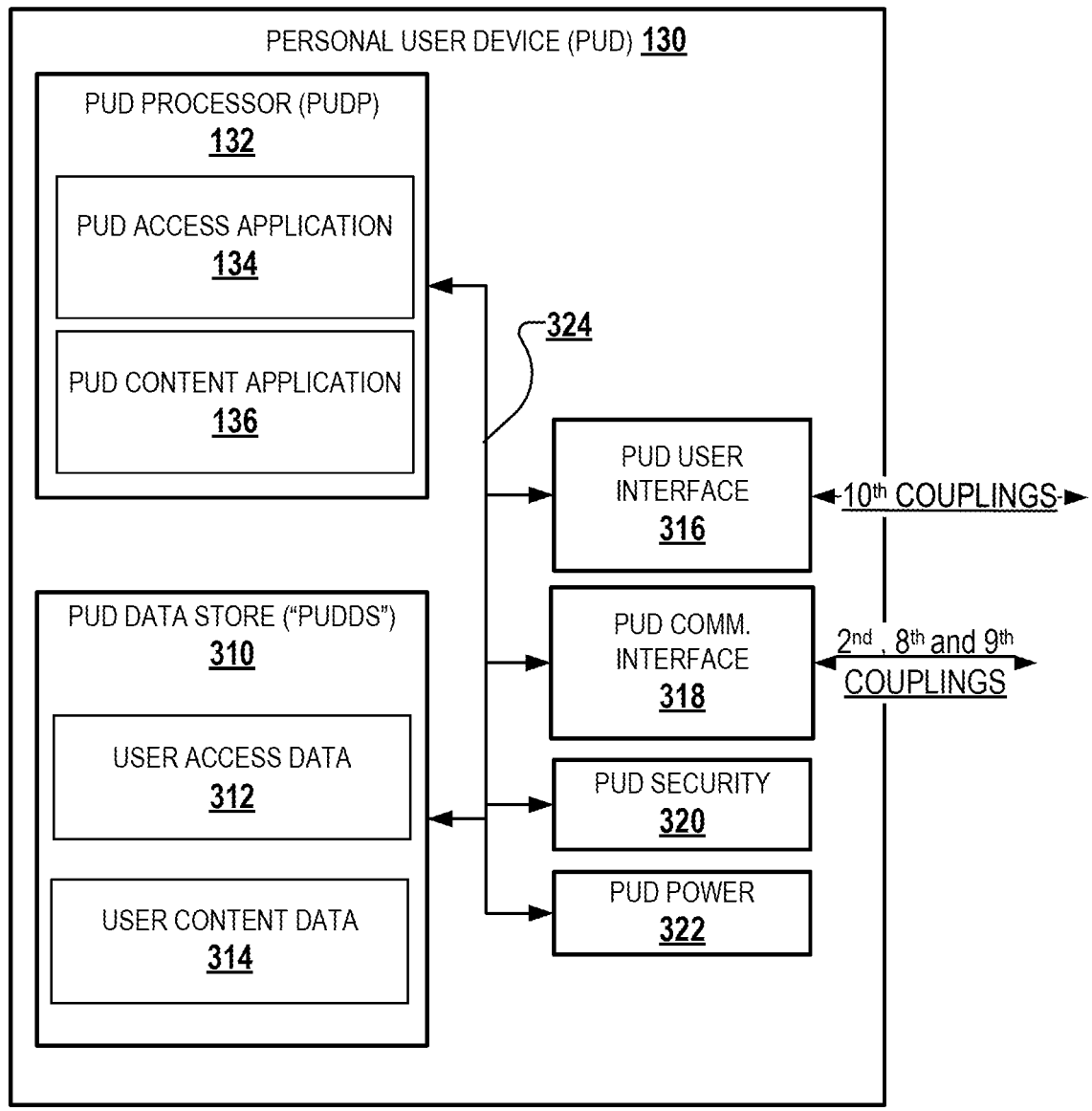
FIG. 3 is a schematic illustration of a personal user device (PUD) configured for use in the secure and non-user identifying log-in system of FIG. 1 and in accordance with at least one implementation of the present disclosure.

As further shown in FIG. 3 and for at least one implementation, the LIS 100 may include a personal user device (PUD) 130. The fixed device client 106 may be communicatively coupled with the PUD 130 by a second coupling 142. The second coupling 142 may be of limited range or accessible from one or more locations, e.g., covering locations within the hotel room or otherwise on the hotel premises.

The PUD 130 may include a PUD processor ("PUDP") 132 executing an access application 134 and a content application 136. Other applications, such as content processing applications, web browser applications, and the like may also be executed by the PUDP 132. The PUD 130 may include a PUD data store 310 configured to temporarily store user access data 312 and user content data 314. Other data may be stored by the PUD data store 310. The PUD 130 may also include a user interface 316 (herein, a "PUD user interface"), and a communications interface 318 (herein, a "PUD communications interface"), a security module 320 (herein, a "PUD security module"), and a power module 322 (herein, a "PUD power module." A bus 324 (herein, the "PUD bus") couples the various PUD 130 components.

Access Application 134

The PUD processor 132 may be configured to execute non-transient computer instructions which instantiate the access application 134. The computer instructions may be stored in the PUD data store 310, provided on the Cloud, or otherwise accessible by the PUD 130.

For at least one implementation, the access application 134 is configured, upon user instruction, automatically (for example, based on a pre-set timer), or otherwise, to perform access operations which may include establishing the $2^{nd}$ coupling with the fixed device 104 and the eighth coupling 154 with the AMS server 122. The access operations may include requesting and receiving the $2^{nd}$ user access code from the fixed device 104 and, upon receipt of the $2^{nd}$ user access code, providing the same to the AMS server 122.

Upon receiving the $2^{nd}$ user access code from the PUD 130, the AMS server 122 verifies the PUD 130 by comparing the $1^{st}$ user access code with the as received $2^{nd}$ user access code. When verified, the PUD 130 may be granted, by the AMS server 122, one or more content privileges and communicates such privileges and the user access code to the content server 124.

It is to be appreciated that the LIS 100 facilitates the secure/verified providing of access, by a PUD 130, to content 125 stored on a content server 124 without the given user having to input log-in information into the PUD 130 or the PUD 130 otherwise having to communicate log-in data to one or more of the AMS server 122 and/or the content server 124. Similarly, log-in information and log-in data for the given user is not communicated by and/or between the fixed device 104 with the AMS server 122, the PMS server 120 with the AMS server 122, or either of the PMS server 120 or the AMS server 122 with the content server 124.

Content Application 134

The PUD processor 132 may be configured to execute non-transient computer instructions which instantiate a content application 136. The computer instructions may be stored in the PUD data store 310, provided on the Cloud, or otherwise accessible by the PUD 130.

For at least one implementation, the content application 134 is configured, upon user instruction, automatically (for example, based on a pre-set timer), or otherwise, to perform content operations which may include establish the ninth coupling 156 with the content server 124.

For at least one implementation, the content application 134 may be configured, upon user instruction, to perform content operations which further include requesting one or more instances of content control activity data, for the given user, from the AMS server 122. The content control activity data may be utilized by the PUD 130 to perform one or more content activities, such as one or more trick-play operations, and with respect to one or more instances of content 125, as provided by the content server 124.

For at least one implementation, the content application 134 may be configured, upon user instruction, automatically, or otherwise, to perform content operation which may further include requesting one or more instances of content preference data, for the given user, from the AMS server 122. The content preference data may be utilized by the PUD 130 to configure one or more features, settings, or the like of the PUD 130. For example, a time use restriction may be included in the content preference data and utilized by the PUD 130 to restrict hours of use/operation of the PUD 130 by one or more given users having access to the PUD 130. For another non-limiting example, the content preference data may limit channels, genres, ratings, or other characteristics of content available from the content server 124.

For at least one implementation, the content operations may include utilizing content preference data when searching the content server 124 for content 125 that may be of interest to the given user.

For at least one implementation, the content operations may include requesting from the content server 124, and providing to the PUD 130 (for processing by other components thereof), content 125 available to the personal user device 130 for presentation to the given user. The content so requested, retrieved and provided may be determined in view of the $2^{nd}$ user access code communicated by the PUD 130 to the content server 124.

For at least one implementation, data communicated in the $1^{st}$ user code and in the $2^{nd}$ user code to the content server 124 may include the same operative data (i.e., data that is provided in a body of a data transmission and is not utilized for routing, decryption or similar standard data communication processes).

For at least one implementation, the $1^{st}$ user code and the $2^{nd}$ user may provide different operative data. For example, the $1^{st}$ user code may provide a first given user (e.g., a parent) access to a first content (e.g., an R rated movie) provided by the content server 124 using the fixed device 104 in the on-property premises 102, while the $2^{nd}$ user code provides a second given user (e.g., a child) using a PUD 130 access to a second content (e.g., a G rated movie) provided by the content server 124 in the on-property premises and without the content server 124 receiving log-in information/log-in data that identifies the parent or the child.

Log-In Application 121

For at least one implementation, the PMS server 120 may include a processor (not shown) that is configured to execute non-transient computer instructions which instantiate a log-in application 121. The computer instructions may be stored in a data store (not shown) accessible by the PMS server 120.

For at least one implementation, the log-in application 121 is configured to perform log-in operations which include checking in and checking out of the given user at a given hotel and other similar interactions between the given user and the hospitality provider. Such interactions are beyond the scope of the present disclosure but typically include the given user providing user identifiable information, as log-in information (as represented by arrow 143 in FIG. 1). The log-in information may be provided to the PMS server 120 using any known or later arising devices and/or process for so communicating with non-limiting examples including use of pen and paper, text message, email, an application program associated with the hospitality provider, or otherwise.

Upon being provided with the log-in information for the given user, and the PMS server 120 and the log-in application 121 executed thereby may perform log-in operations that include verifying the log-in information. When verified, the given user may be permitted, by the PMS server 120 or another server coupled to the PMS server 120, to use one or more of the fixed devices 104, facilities and/or services provided by the hospitality provider. To facilitate such access the log-in application 121 may perform log-in operations that include generating the user code and communicating the user code to one or more fixed devices 104 (as shown by use of the third coupling 144) allocated to (e.g., as being provided in a hotel room reserved for the given user) and/or otherwise available for use by the given user.

The fixed device 104 to which a given user is granted access privileges, as represented by the user code, may be located in a hotel room assigned to the given user and/or in other locations with respect to which the PMS server 120 can control the access to and/or user of one or more fixed devices 104 associated with the hospitality provider or another entity cooperating with the hospitality provider in facilitating the log-in system 100.

For at least one implementation, the user code generated by the log-in application 121 may be a unique code that identifies the user for a given stay with the hospitality provider. For at least one implementation, log-in information/log-in data for the given user is not provided in, with or accessible using the user code.

Account Management Application 123

For at least one implementation, the AMS server 122 may include a processor (not shown) that is configured to execute non-transient computer instructions which instantiate an account management application (the "AMS-App") 123. The computer instructions may be stored in a data store (not shown) accessible by the PMS server 120.

For at least one application, the AMS-app 123 may be configured to perform AMS operations including receiving, from the fixed device client 106, and storing user content control activity data and user content preference activity data.

For at least one implementation, the AMS operations may include generating, based on the user code provided by the PMS server 120, the user access code. For at least one implementation, the user access code enables the given user to gain access, during a given time or otherwise, using their PUD 130, to content control activity data and content preference activity data that the given user has generated or will generate using the fixed device 104. For at least one implementation, the user access code does not include log-in information for the given user and the AMS-App 123 is not provided with log-in information for the given user. Accordingly, the AMS-App 123 is not configured or enabled to associate log-in information for the given user with the user access code.

For at least one implementation, the given user can access content 125, using the fixed device 104, by providing a content server 124 with the user access code. The user access code provides information sufficient for the given user to access one or more of such content, content control activity data, and content preference activity data without the given user having to provide log-in information to the AMS server 122, to the content server 124, or the like.

For at least one implementation, the AMS-App 123 may be configured to perform AMS operations including associating the user access code with one or more instance of content control activity data and/or content preference activity data stored by the AMS server 122 in a suitable data store. For at least one implementation, the AMS operations may include associating the user access code with content control activity data and/or content preference activity data that has been generated only during the given user's current stay at the hotel. For another implementation, the AMS operations may include associating the user access code with current and past generated instances of content control activity data and/or content preference activity data for the given user based upon multiple user codes being provided by the PMS server 120 to the AMS server 122 including a past access code for a past log-in event for the given user with the hospitality provider and a current access code for the current log-in event of the given user with the hospitality provider. The AMS server 122 may be configured to store associations of past user codes with past user access codes, and further associations of past instances of content control activity data and/or past instances of content preference data with the past user access code. The AMS operations may include generating, creating and/or storing associations of the past instances of content control activity and/or content preference data with past or current instances of log-in information for the given user.

The AMS server 122 may be further configured to communicate the user access code to the content server 124.

For at least one implementation, the AMS server 122 does not communicate the user access code, content control activity data, or content preference data, for any given user, to the PMS server 120. Accordingly, access to the user access code, content control activity data, and/or content preference data for the given user is accessible only via the AMS server 122 and is not accessible via the PMS server 120. This configuration further provides a privacy and data security layer in that only the PMS server 120 has access to log-in information while only the AMS server 122 has access to content control activity data, content preference data and associations thereof with the user access code.

Figure 4:
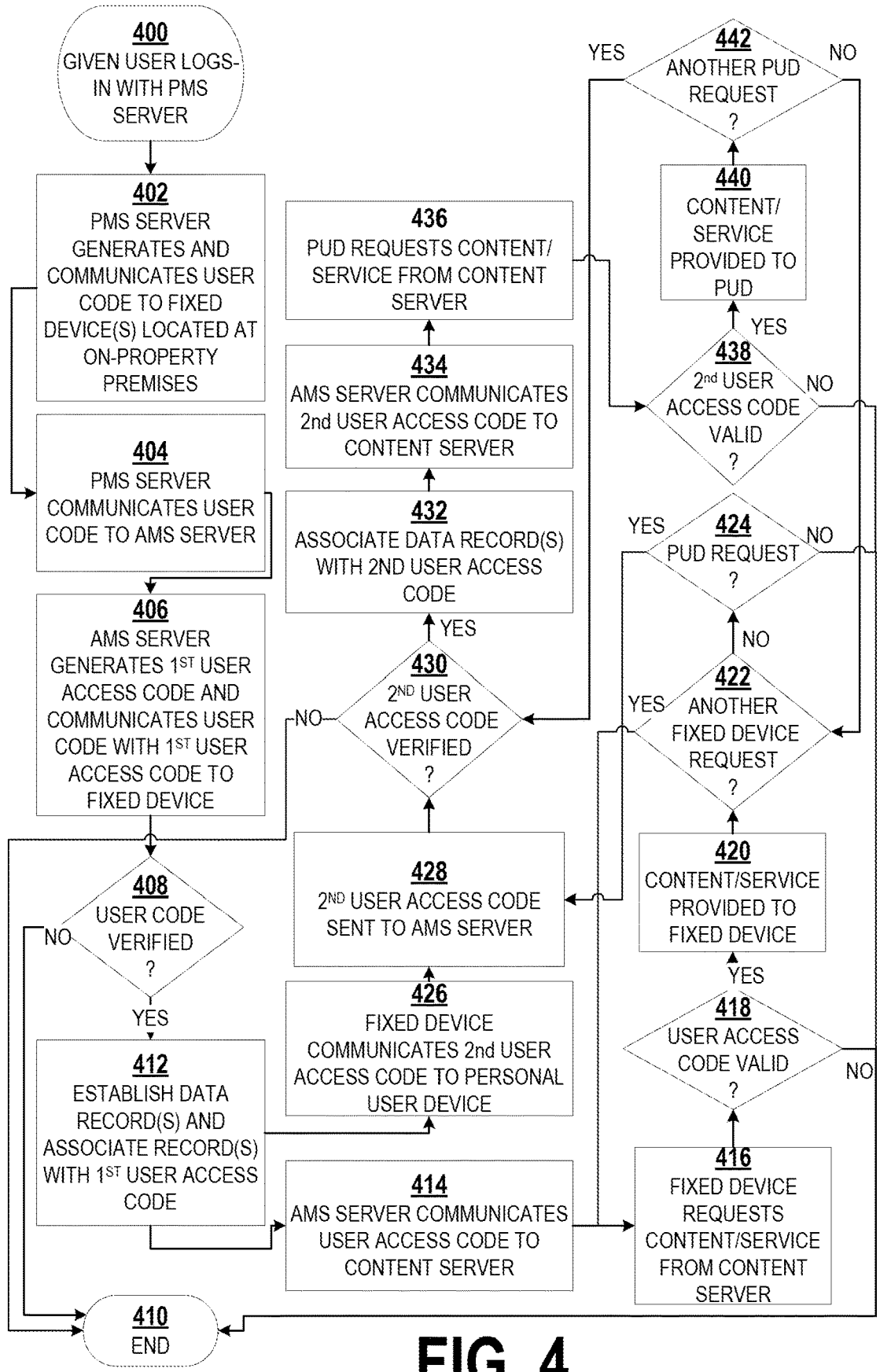
FIG. 4 is a flow chart illustrating a process for providing a secure and non-user identifying log-in system and in accordance with at least one implementation of the present disclosure.

As shown in FIG. 4 and for at least one implementation, a process for providing a secure and non-user identifying log-in system may include one or more of the following operations.

As per Operation 400, the process may include the given user logging-in with the PMS server 120. The given user may log-in using any known or later arising devices, systems and processes including logging-in in-person (e.g., at a hotel reception desk, on-line, or otherwise).

As per Operation 402, the process may include the PMS server 120 generates and communicates the user code to at least one fixed device 104 located within a hotel room assigned to the given user and/or to one or more, if any, or other on-property premises fixed device(s) 104 that the given user has requested to utilize (e.g., a hotel business center computer, printer, or the like). The user code as communicated by the PMS server 120 to the fixed device(s) 104 is, again, herein referred to as the $1^{st}$ instance of the user code or "$1^{st}$ user code."

As per Operation 404, the process may include the PMS server communicating the user code to the AMS server 122. The user code as communicated by the PMS server 120 to the AMS server 122 is herein referred to as the $2^{nd}$ instance of the user code or "$2^{nd}$ user code." For at least one implementation, the $1^{st}$ user code and the $2^{nd}$ user code contain the same operative data.

The user code provides a verified, non-given user identifying code which the AMS server 122 may later use to verify requests by the given user, as anonymously represented by the $1^{st}$ user code, to utilize one or more features and/or functions provided by the hospitality provider, such as streaming content, using the content server 124, storing content control activity data and/or storing content preference data and/or utilizing stored data for later use, and the like.

As per Operation 406, the process may include the AMS server 122, upon receiving the user code, generating the user access code and transmitting the user access with the user code to the fixed device 104. For at least one implementation, the fixed device client 106 may be configured to communicate to the AMS server 122, in two data packets, with a first data packet containing the user code and the second data packet containing the $1^{st}$ user access code. The AMS server 122 may be configured to accept the second data packet when it has the same cryptologic signature as the first data packet-thereby ensuring a correspondence between the user code and the $1^{st}$ user access code exists at the fixed device 104 and at the AMS server 122. Other methods may be used to verify that data in the first data packet and the data in the second data packet correspond. For another implementation, the user code may be embedded into the $1^{st}$ user access code. For at least one implementation, the user access code may be a randomly generated code that does not contain therein user log-in information. For at least one implementation, the user access code is generated as a QR code.

As per Operation 408, the process may include the AMS server 122 verifying the user code received from the fixed device 104 (herein a second instance of the user code—"$2^{nd}$ user code" against the $1^{st}$ user code received from the PMS server 120. Ideally, the $1^{st}$ user code and the $2^{nd}$ user code contain the same operative data. If not verified, the process proceeds ends as per Operation 410. If verified, the process proceeds to Operation 412.

As per Operation 410 and when the user code provided by the fixed device 104 cannot be verified against one or more user codes previously provided by the PMS server 120, the process ends. It is to be appreciated that the verification may fail for any number of reasons including corrupted data, lapse of time, or otherwise. For at least one implementation, the $1^{st}$ user code, as provided by the PMS server 120 to the AMS server 122, has a given validity period, such as for thirty (30) minutes from a time of communication of the $1^{st}$ user code, by the PMS server 120, to the AMS server 122. Other validity periods may be used for other implementations. If the $2^{nd}$ user code is not provided by a fixed device 104 to the AMS server 122 and within the given validity period, the user code may expire and need to be renewed by the given user repeating one or more steps or operations in a log-in process utilized by the hospitality provider and/or as specified by the PMS server.

As per Operation 412 and when the AMS server 122 is able to verify the $2^{nd}$ user code provided by the fixed device 104 against the $1^{st}$ user code provided by the PMS server 120, the process may include the AMS server 122 establishing at least one data record, in a data store coupled to the AMS server 122, which may be populated with one or more of content control activity data and content preference data. The AMS server 122 may further associate such stored data with the $1^{st}$ user access code, and thereby establish an anonymous association of the given user, as represented by the $1^{st}$ user access code, with the content control activity data and/or content preference data, and without receiving or identifying log-in information for the given user.

As per Operation 414, the process may include the AMS server 122 communicating the user access code to the content server 124.

As per Operation 416, the process may include the fixed device 104 communicating a request to receive content and/or utilize other services (e.g., a request to utilize a print service) to the content server 124. For at least one implementation, the request includes the user access code.

As per Operation 418, the process may include the content server 124 verifying the user access code provided with the request is valid. For at least one implementation, the user access code, as received from the fixed device 104, is validated against one of one or more user access codes received from the AMS server 122. If validated, the process proceeds to Operation 420. If not validated, the process proceeds to Operation 410.

As per Operation 420, the process may include the requested content and/or service being provided, by the content server 124, to the fixed device 104. The providing of the requested content and/or service may include content and/or service of any known or later arising type, form, size, or the like.

As per Operation 422, the process may include one or both of the fixed device and the content server determining whether another request, from the fixed device, for content and/or service(s) is to be validated and fulfilled. If "yes," the process returns to Operation 416. If "no," the process proceeds to Operation 424.

As per Operation 424, the process may include determining whether a request for content and/or service(s) is from a personal user device 130. If "yes," to process proceeds to Operation 428. If "no," the process proceeds to Operation 410.

As per Operation 426, the process may include the fixed device 104 generating and communicating the user access code to the PUD 130 as the $2^{nd}$ user access code The communicating of the $2^{nd}$ user access code, by the fixed device 104, to the personal user device 130 may occur using any known or later arising devices, systems and processes for communicating codes between devices. For at least one implementation, the $2^{nd}$ user access code is a QR code that is presented to the given user on the first user interface device (e.g., a television display). The PUD 130 includes a camera and related software that can capture the QR code, e.g., as displayed on the TV display, and therefrom directly or indirectly (e.g., via a website or the like identified in the QR code), obtain the $1^{st}$ user access code. Other known and later arising devices, systems and process for the given user receiving and utilize the $2^{nd}$ user access code may be utilized with an implementation of the present disclosure.

For at least one implementation, the fixed device client 106 may be configured to communicate to the AMS 122, in a third data packet and a fourth data packet, with the third data packet containing the $1^{st}$ user access code and the fourth data packet containing the $2^{nd}$ user access code. Such communication may occur, e.g., when the user access code to be utilized by the PUD 130 has less privileges or the like associated with it than the user access code utilized by the fixed device 104. The AMS 122 may be configured to accept the fourth data packet when it has the same cryptologic signature as the third data packet-thereby ensuring a correspondence between the $1^{st}$ user access code and the $2^{nd}$ user access code exists, or using other methods that verify that data in the third data packet and the data in the fourth data packet correspond. For another implementation, the $1^{st}$ user access code may be embedded into the $2^{nd}$ user access code. For at least one implementation, the $2^{nd}$ user access code may be a randomly generated code that does not contain therein user log-in information but may contain therein or be determinable therefrom the $1^{st}$ user access code.

As per Operation 428, the process may include the PUD 130 sending the $2^{nd}$ user access code to the AMS server 122.

As per Operation 430, the process may include the AMS server 122 verifying the $1^{st}$ user access code communicated to the fixed device 104 with the $2^{nd}$ user access code received from the PUD 130. If not verified, the process proceeds ends as per Operation 410. If verified, the process proceeds to Operation 432.

As per Operation 432, the process may include the AMS server 122 associating with the $2^{nd}$ user access code one or more stored data records (e.g., content control activity data and/or content preference data) associated with the $1^{st}$ user access code. When so associated, the PUD 130 may access the stored data records.

As per Operation 434, the process may include the AMS server 122 communicating the $2^{nd}$ user access code, if different than the $1^{st}$ user access code, to the content server 124.

As per Operation 436, the process may include the PUD 130 communicating a request to receive content and/or utilize other services (e.g., a request to utilize a print service) to the content server 124. For at least one implementation, the request includes the $2^{nd}$ user access code which, as discussed above, may contain the same or different operative data as the $1^{st}$ user access code while providing sufficient information for the content server 124 to verify the content request is permitted.

As per Operation 438, the process may include the content server 124 determining if the $2^{nd}$ user access code received from the PUD 130 is valid by comparing the as received code with the $1^{st}$ user access code previously received from the AMS server 122. If validated, the process proceeds to Operation 440. If not validated, the process proceeds to Operation 410.

As per Operation 440, the process may include the requested content and/or service being provided, by the content server 124, to the PUD 130. The providing of the requested content and/or service may include content and/or service of any known or later arising type, form, size, or the like.

As per Operation 442, the process may include one or both of the PUD 130 and the content server 124 determining whether another request, from the PUD 130, for content and/or service(s) is to be validated and fulfilled. If "yes," the process returns to Operation 430. If "no," the process proceeds to Operation 424.

As shown and for at least one implementation, Operations 426 to 442 may occur independently, substantially simultaneously, prior to, or after one or more of Operations 414 to 424.

It is to be appreciated that the Operations depicted in FIG. 4 may occur in sequence as shown, and/or in any other sequence of operations including one more operations occurring in parallel.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A system comprising:
a fixed device;
an account management system ("AMS") server coupled to the fixed device;
a property management system ("PMS") server coupled to the fixed device and the AMS server;
  wherein the PMS server associates, at a given time, the fixed device with a given user;
a personal user device ("PUD") coupled to the AMS server and the fixed device; and
a content server coupled to the fixed device, the AMS server and the PUD;
wherein the fixed device comprises:
  a fixed device processor; and
  a non-transitory fixed device data store, coupled to the fixed device processor, storing first computer instructions which, when executed by the fixed device processor, instantiate a presence application; and
  wherein the presence application configured the fixed device to perform presence operations including:
    receiving a $1^{st}$ user code from the PMS server;
    receiving a $1^{st}$ user access code from the AMS server; and
    communicating the $1^{st}$ user access code as a $2^{nd}$ user access code to the PUD; and
wherein the $2^{nd}$ user access code is utilized by the AMS server to verify the PUD can access data stored by the AMS server;
wherein the content server receives the $2^{nd}$ user access code from the PUD;
wherein the content server verifies the $1^{st}$ user access code against a $2^{nd}$ user access code;
wherein the content server grants the PUD access to at least one content when a result of the verifying of the $1^{st}$ user access code against the $2^{nd}$ user access code yields a positive result; and
wherein the $2^{nd}$ user access code is utilized by the content server to validate a request, from the PUD, to receive content from the content server.

2. The system of claim 1,
wherein the presence operations further comprise:
  communicating a $2^{nd}$ user code to the AMS server;
wherein the AMS server receives the $1^{st}$ user code from the PMS server; and
wherein the $1^{st}$ user code and the $2^{nd}$ user code are utilized by the AMS server to verify the fixed device can execute one or more content operations including providing at least one of content control activity data and content preference data to the AMS server for storage by the AMS server.

3. The system of claim 2,
wherein the PMS server associates the $1^{st}$ user code with log-in information for the given user.

4. The system of claim 3,
wherein the $1^{st}$ user code does not contain the log-in information.

5. The system of claim 4,
wherein the PMS server independently communicates the $1^{st}$ user code to the AMS server;
wherein the presence operations further comprise:
  receiving, in a combined data transmission, the $1^{st}$ user code and the $1^{st}$ user access code from the AMS server; and
wherein the AMS server comprises:
  an AMS processor executing non-transitory computer instructions, which instantiate an AMS app which performs AMS operations including:
    comparing the $1^{st}$ user code against the $2^{nd}$ user code; and
    verifying the fixed device when a result of the comparing of the $1^{st}$ user code against the $2^{nd}$ user code indicates that operative data in the $1^{st}$ user code matches operative data in the $2^{nd}$ user code.

6. The system of claim 5,
wherein the AMS operations further comprise:
  receiving content control activity data from the fixed device at the given time; and
  associating the content control activity data with the $1^{st}$ user access code.

7. The system of claim 6,
wherein the AMS operations further comprise:
  receiving content preference data from the fixed device at the given time; and
  associating the content preference data with the $1^{st}$ user access code.

8. The system of claim 7,
wherein the AMS operations further comprise:
  verifying the $2^{nd}$ user access code against the $1^{st}$ user access code; and
  when verified, allowing the PUD to access one or more of content control activity data and the content preference data.

9. An account management system ("AMS") server comprising:
an AMS processor; and
a non-transitory AMS data store, coupled to the AMS processor, storing non-transitory computer instructions which, when executed by the AMS processor, instantiates an AMS application that performs AMS operations comprising:
  receiving a $1^{st}$ user code independently communicated by a property management system ("PMS") server to the AMS;
  generating a user access code;

communicating, in a combined data transmission, the $1^{st}$ user code and a $1^{st}$ user access code to a fixed device coupled to the AMS server;

receiving a $2^{nd}$ user access code from a personal user device ("PUD") coupled to the fixed device and the AMS server;

wherein the $1^{st}$ user access code has been previously provided by the fixed device, as the $2^{nd}$ user access code, to the PUD;

comparing the $1^{st}$ user access code with the $2^{nd}$ user access code; and verifying the PUD can access data stored by the AMS server when the $1^{st}$ user access code and the $2^{nd}$ user access code contain identical operative data.

10. The AMS server of claim 9,
wherein the data stored by the AMS server includes content control activity data corresponding to one or more interactions by a given user of the fixed device; and
wherein the content control activity data has been previously communicated by the fixed device to the AMS server in at least one data packet that includes the $1^{st}$ user access code.

11. The AMS Server of claim 10,
wherein the content control activity data includes data indicative of at least one trick-play operation previously requested by the given user of the fixed device.

12. The AMS server of claim 9,
wherein the data stored by the AMS server includes content preference data corresponding to one or more preferences for a given user of the fixed device; and
wherein the content preference data has been previously determined by at least one of the fixed device and AMS server based on previous preference indications by the given user.

13. The AMS server of claim 9,
wherein the AMS operations further comprise:
communicating the $1^{st}$ user access code to a content server;
wherein the content server verifies the $1^{st}$ user access code against a $2^{nd}$ user access code received from the PUD; and
wherein the content server grants the PUD access to at least one content when a result of the verifying of the $1^{st}$ user access code against the $2^{nd}$ user access code yields a positive result.

14. The AMS server of claim 9,
wherein the data stored by the AMS server includes content control activity data received from the fixed device; and
wherein the $2^{nd}$ user access code is associated by the AMS server with the content control activity data.

15. The AMS server of claim 14,
wherein the content control activity data identifies at least one trick-play operation initiated by the given user and with respect to a given content and enables the PUD to release the trick-play operation and resume presentation of the given content on the PUD.

16. The AMS server of claim 15,
wherein the trick-play operation is a pause in a presentation of the given content on the fixed device; and
wherein the release of the trick-play operation is a resumption of the presentation of the given content one at least one of the fixed device and the PUD.

17. The AMS server of claim 9,
wherein the data stored by the AMS server includes content preference data generated by the AMS server based on content requested by the fixed device from the content server; and
wherein the $2^{nd}$ user access code is associated by the AMS server with the content preference data.

18. The AMS server of claim 17,
wherein the content preference data limits content the PUD can receive from the content server by at least one of content rating, genre, and subject matter.

19. A non-transitory computer readable medium, having stored thereon computer instructions which, when executed by a processor of an account management system ("AMS") server, causes the AMS server to perform operations comprising:
generating a user access code;
communicating a $1^{st}$ user access code to a fixed device coupled to the AMS server;
receiving a $2^{nd}$ user access code from a personal user device ("PUD") coupled to the fixed device and the AMS server;
wherein the $1^{st}$ user access code has been previously provided by the fixed device, as the $2^{nd}$ user access code, to the PUD;
verifying the PUD can access data stored by the AMS server when the $1^{st}$ user access code and the $2^{nd}$ user access code contain identical operative data; and
communicating the $1^{st}$ user access code to a content server;
wherein the content server verifies the $1^{st}$ user access code against a $2^{nd}$ user access code received from the PUD; and
wherein the content server grants the PUD access to at least one content when a result of the verifying of the $1^{st}$ user access code against the $2^{nd}$ user access code yields a positive result.

20. The non-transitory computer readable medium of claim 19,
wherein the data stored by the AMS server includes content control activity data received from the fixed device;
wherein the $2^{nd}$ user access code is associated by the AMS server with the content control activity data;
wherein the content control activity data includes data indicative of at least one trick-play operation previously requested by a given user of the fixed device;
wherein the trick-play operation is a pause in a presentation of a given content on the fixed device;
wherein a release of the trick-play operation is a resumption of the presentation of the given content one at least one of the fixed device and the PUD;
wherein the data stored by the AMS server further includes content preference data corresponding to one or more preferences for a given user of the fixed device; and
wherein the content preference data has been previously determined by at least one of the fixed device and AMS server based on previous preference indications by the given user.

* * * * *